United States Patent
Tadano

(10) Patent No.: US 10,244,183 B2
(45) Date of Patent: Mar. 26, 2019

(54) IMAGE CAPTURING DEVICE AND METHOD OF CONTROLLING IMAGE CAPTURING DEVICE

(71) Applicant: Sony Corporation, Tokyo (JP)

(72) Inventor: Ryuichi Tadano, Kanagawa (JP)

(73) Assignee: Sony Corporation, Tokyo (JP)

(*) Notice: Subject to any disclaimer, the term of this patent is extended or adjusted under 35 U.S.C. 154(b) by 0 days.

(21) Appl. No.: 15/504,794

(22) PCT Filed: Jul. 9, 2015

(86) PCT No.: PCT/JP2015/069727
§ 371 (c)(1),
(2) Date: Feb. 17, 2017

(87) PCT Pub. No.: WO2016/031402
PCT Pub. Date: Mar. 3, 2016

(65) Prior Publication Data
US 2017/0280042 A1   Sep. 28, 2017

(30) Foreign Application Priority Data
Aug. 27, 2014  (JP) ................. 2014-172194

(51) Int. Cl.
*H04N 5/235* (2006.01)
*H04N 5/353* (2011.01)
(Continued)

(52) U.S. Cl.
CPC ......... *H04N 5/2357* (2013.01); *H04N 5/2353* (2013.01); *H04N 5/3532* (2013.01); *H04N 5/374* (2013.01); *H04N 5/378* (2013.01)

(58) Field of Classification Search
CPC .................. H04N 5/2357; H04N 5/2353
See application file for complete search history.

(56) References Cited

U.S. PATENT DOCUMENTS

| 2006/0055823 A1 | 3/2006 | Kinoshita et al. |
| 2009/0219409 A1 | 9/2009 | Mikami |

(Continued)

FOREIGN PATENT DOCUMENTS

| JP | 2004-222228 A | 8/2004 |
| JP | 2005-027137 A | 1/2005 |

(Continued)

*Primary Examiner* — Ahmed A Berhan
(74) *Attorney, Agent, or Firm* — Wolf, Greenfield & Sacks, P.C.

(57) ABSTRACT

[Object] To easily determine whether a flicker component is present.
[Solution] An image sensor performs a process of generating image data by exposing a plurality of lines, each of which including a plurality of pixels, in sequence over a predetermined exposure time from exposure start timings that are different from each other whenever a predetermined period of a vertical synchronization signal elapses. A timing controller performs control for shifting each of the exposure start timings by a fixed time interval whenever the period elapses. A determination unit determines whether a component having luminance varying at a predetermined frequency along a direction perpendicular to the plurality of lines in the image data is present. A removal unit removes the component in the image data in a case where the component is determined to be present.

9 Claims, 14 Drawing Sheets

(51) Int. Cl.
*H04N 5/378* (2011.01)
*H04N 5/374* (2011.01)

(56) References Cited

U.S. PATENT DOCUMENTS

| | | | |
|---|---|---|---|
| 2010/0045819 A1* | 2/2010 | Pillman | H04N 5/235 348/226.1 |
| 2011/0221929 A1 | 9/2011 | Miyahara et al. | |
| 2012/0162466 A1* | 6/2012 | Katagawa | H04N 5/2351 348/226.1 |

FOREIGN PATENT DOCUMENTS

| | | |
|---|---|---|
| JP | 2009-212627 A | 9/2009 |
| JP | 2011-193065 A | 9/2011 |
| JP | 2012-165118 A | 8/2012 |

\* cited by examiner

FIG. 8

| PRESENCE OF SHIFT | AMOUNT OF VARIATION IN PHASE OF FLICKER COMPONENT AT POWER FREQUENCY OF 50 Hz ||||||
|---|---|---|---|---|---|---|
| | FRAME F1 | FRAME F2 | FRAME F3 | FRAME F4 | FRAME F5 | FRAME F6 |
| NO SHIFT | 0 | $4\pi/3$ (=-120°) | $2\pi/3$ (=+120°) | 0 | $4\pi/3$ (=-120°) | $2\pi/3$ (=+120°) |
| SHIFT BY $2\pi/3$ | 0 | $2\pi/3$ (=+120°) | $4\pi/3$ (=-120°) | 0 | $2\pi/3$ (=+120°) | $4\pi/3$ (=-120°) | a

| PRESENCE OF SHIFT | AMOUNT OF VARIATION IN PHASE OF FLICKER COMPONENT AT POWER FREQUENCY OF 60 Hz ||||||
|---|---|---|---|---|---|---|
| | FRAME F1 | FRAME F2 | FRAME F3 | FRAME F4 | FRAME F5 | FRAME F6 |
| NO SHIFT | 0 | 0 | 0 | 0 | 0 | 0 |
| SHIFT BY $2\pi/3$ | 0 | $4\pi/3$ (=-120°) | $2\pi/3$ (=+120°) | 0 | $4\pi/3$ (=-120°) | $2\pi/3$ (=+120°) | b

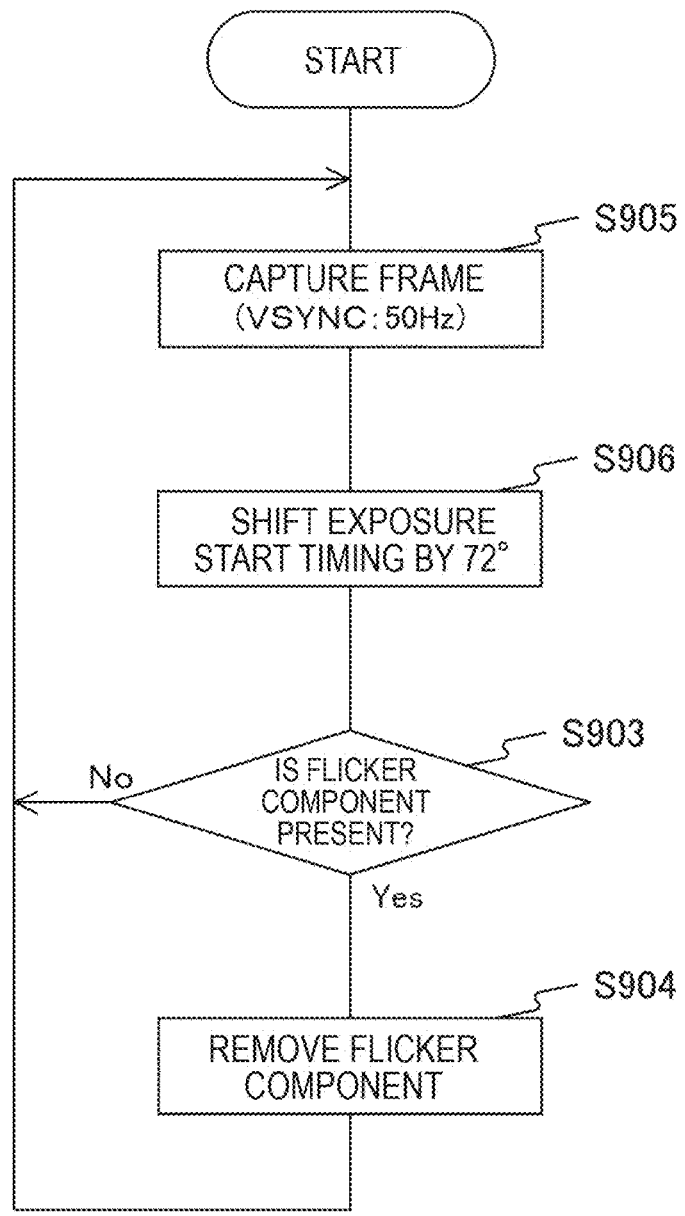

FIG. 11

| PRESENCE OF SHIFT | AMOUNT OF VARIATION IN PHASE OF FLICKER COMPONENT AT POWER FREQUENCY OF 50 Hz | | | | | |
|---|---|---|---|---|---|---|
| | FRAME F1 | FRAME F2 | FRAME F3 | FRAME F4 | FRAME F5 | FRAME F6 |
| NO SHIFT | 0 | 0 | 0 | 0 | 0 | 0 |
| SHIFT BY $2\pi/5$ | 0 | $2\pi \cdot (4/5)$ ($=-72°$) | $2\pi \cdot (3/5)$ ($=-144°$) | $2\pi \cdot (2/5)$ ($=-216°$) | $2\pi \cdot (1/5)$ ($=-288°$) | 0 | a

| PRESENCE OF SHIFT | AMOUNT OF VARIATION IN PHASE OF FLICKER COMPONENT AT POWER FREQUENCY OF 60 Hz | | | | | |
|---|---|---|---|---|---|---|
| | FRAME F1 | FRAME F2 | FRAME F3 | FRAME F4 | FRAME F5 | FRAME F6 |
| NO SHIFT | 0 | $2\pi \cdot (2/5)$ ($=+144°$) | $2\pi \cdot (4/5)$ ($=+288°$) | $2\pi \cdot (1/5)$ ($=+72°$) | $2\pi \cdot (3/5)$ ($=+216°$) | 0 |
| SHIFT BY $2\pi/5$ | 0 | $2\pi \cdot (1/5)$ ($=+72°$) | $2\pi \cdot (2/5)$ ($=+144°$) | $2\pi \cdot (3/5)$ ($=+216°$) | $2\pi \cdot (4/5)$ ($=+288°$) | 0 | b

IMAGE CAPTURING DEVICE AND METHOD OF CONTROLLING IMAGE CAPTURING DEVICE

CROSS-REFERENCE TO RELATED APPLICATIONS

This application is a National Stage of International Application No. PCT/JP2015/069727, filed in the Japanese Patent Office as a Receiving office on Jul. 9, 2015, which claims priority to Japanese Patent Application Number 2014-172194, filed in the Japanese Patent Office on Aug. 27, 2014, each of which is hereby incorporated by reference in its entirety.

TECHNICAL FIELD

The present technology relates to an image capturing device and a method of controlling the image capturing device, and more particularly, relates to a rolling shutter type image capturing device and a method of controlling the image capturing device.

BACKGROUND ART

Light sources, such as fluorescent and mercury lamps, which repeat flashing of light at twice the frequency of a fixed power frequency has been widely used to achieve sufficient brightness inside of the room or the like. Under such a light source, if image capture is performed in a rolling shutter mode in which exposure timing is different for each line, a component having luminance varying at a fixed frequency along the direction perpendicular to the line occurs in image data, which causes a phenomenon that appears as a horizontal stripe. This horizontal stripe is caused by difference between the power frequency of a light source and a horizontal synchronization frequency that scans the line, and thus is called a flicker component. Furthermore, the position of a flicker component in the image data, that is, the phase may vary for each frame (or a field) in a moving image. The amount of variation in phases for each frame when a phase varies is determined from the power frequency of a light source and a vertical synchronization frequency of an image sensor.

In one example, in a case where the power frequency is 50 hertz (Hz) and the vertical synchronization frequency is 59.94 hertz (Hz), the amount of variation in phases for each frame is approximately one third (⅓) of a period of a vertical synchronization signal. Thus, the phase of a flicker component completes one cycle through three frames and returns to a phase that is substantially the same as that prior to the three frames.

An image capturing device capable of determining whether a flicker component is present by calculating an average value for each line of three successive frames in time series is developed (e.g. see Patent Literature 1). This image capturing device determines whether a flick component is present based on a result obtained by dividing each line of a current frame by an average value of the corresponding lines of three successive frames including the current frame. Then, the image capturing device, when determining that a flicker component is present, removes the flicker component from image data, thereby improving the image quality of the image data.

CITATION LIST

Patent Literature

Patent Literature 1: JP 2012-165118A

DISCLOSURE OF INVENTION

Technical Problem

In the related art described above, the determination of whether a flicker component is present is made on the assumption that the phase of a flicker component varies for each frame to some extent. However, in a case where a combination of the power frequency and the vertical synchronization frequency is a particular combination, there will be little variation in phases. In this regard, the amount of variation in phases of a flicker component for each frame is calculated from the power frequency and the vertical synchronization frequency, in one example, using the following formula.

[Math. 1]

$$\Delta\theta = \left(2\pi \cdot \frac{2f_p}{f_v}\right) \bmod 2\pi \qquad \text{Formula (1)}$$

In the above formula, the left-hand side represents an amount of variation in phases for each frame. Furthermore, $f_p$ is the power frequency, and $f_v$ is the vertical synchronization frequency. The unit of these frequencies is hertz (symbol Hz), in one example. Furthermore, "mod" represents a process of calculating a remainder obtained by dividing its immediately previous numerical value by its immediately subsequent numerical value.

In one example, in a case where the power frequency is 60 hertz (Hz) and the vertical synchronization frequency is 59.94 hertz (Hz), the amount of variation in phases for each frame in accordance with Formula (1) is approximately ⅟500 of a period of a vertical synchronization signal, which is very small value. Furthermore, in a case where both the power frequency and the vertical synchronization frequency are 50 hertz (Hz), the amount of variation in phases in accordance with Formula (1) is "0". In this way, in the case where the phase has little variation, the image capturing device described above is difficult disadvantageously to determine whether a flick component is present.

The present technology is made in view of such circumstances, and an object thereof is to allow easy determination of whether a flicker component is present.

Solution to Problem

The present technology has been made in order to solve the above problem, and an aspect of the present technology is to provide an image capturing device including: an image sensor configured to perform a process of generating image data by exposing a plurality of lines, each of which including a plurality of pixels, in sequence over a predetermined exposure time from exposure start timings that are different from each other whenever a predetermined period of a vertical synchronization signal elapses; a timing controller configured to perform control for shifting each of the exposure start timings by a fixed time interval whenever the period elapses; a determination unit configured to determine whether a component having luminance varying at a predetermined frequency along a direction perpendicular to the plurality of lines in the image data is present; and a removal unit configured to remove the component in the image data in a case where the component is determined to be present, and a method of controlling the image capturing device. Accordingly, the control for shifting each of the exposure start timing by the fixed time interval is performed advantageously whenever the period elapses.

According to the first aspect, the predetermined frequency may be any one of two frequencies that are different from each other, and the fixed time interval may be a value corresponding to a larger one of an amount of variation in the period of a phase of the component of the one of the two frequencies and an amount of variation in the period of a phase of the component of the other of the two frequencies. Accordingly, the control for shifting the exposure start timing by time corresponding to a larger one of amounts of variation associated with two respective frequencies is performed advantageously.

According to the first aspect, the vertical synchronization signal may be a signal conforming to a National Television System Committee (NTSC) standard, and the fixed time interval may be one third of the period. Accordingly, the control for shifting the exposure start timing by one third of the period is performed advantageously.

According to the first aspect, the image data may include a plurality of pieces of line data, and the flicker component determination unit may include an average value calculation unit configured to calculate an average value of the line data in a period of time three times longer than the period, a divider configured to divide the line data by the average value and output a divided value, a frequency analysis unit configured to analyze a frequency of a signal of the divided value and generate an analysis result, and a determination result generation unit configured to determine whether the component is present based on the analysis result and generate a determination result. Accordingly, the frequency of the signal of the divided value obtained by dividing the line data by the average value of the line data in the period of time three times longer than the period is analyzed advantageously.

According to the first aspect, the vertical synchronization signal may be a signal conforming to a Phase Alternating Line (PAL) standard, and the fixed time interval may be one fifth of the period. Accordingly, the control for shifting the exposure start timing by one fifth of the period is performed advantageously.

According to the first aspect, the flicker component determination unit may include an average value calculation unit configured to calculate an average value of the line data in a period of time five times longer than the period, a divider configured to divide the line data by the average value and output a divided value, a frequency analysis unit configured to analyze a frequency of a signal of the divided value and generate an analysis result, and a determination result generation unit configured to determine whether the component is present based on the analysis result and generate a determination result. Accordingly, the frequency of the signal of the divided value obtained by dividing the line data by the average value of the line data in the period of time five times longer than the period is analyzed advantageously.

According to the first aspect, control for shifting an output timing to output the image data by a time corresponding to the fixed time interval may be performed whenever the period elapses for outputting the image data based on the shifted output timing. Accordingly, the image data is outputted advantageously at the timing shifted by time corresponding to the fixed time interval.

According to the first aspect, the removal unit may remove the component by setting the exposure time to a fixed value. Accordingly, the image data is generated advantageously in the exposure time that is set to the fixed value.

According to the first aspect, the image data may include a plurality of pieces of pixel data, and the removal unit may remove the component by incrementing or decrementing a value of each of the plurality of pieces of pixel data. Accordingly, each of the plurality of pieces of pixel data is incremented and decremented advantageously.

Advantageous Effects of Invention

According to the present technology, the determination of whether a flicker component is present can be made effective and with ease. Moreover, the advantageous effect described above is not limited thereto, but may be any effect described herein.

BRIEF DESCRIPTION OF DRAWINGS

FIG. 8 is a diagram illustrating an example of an amount of variation in phases of a flicker component in the first embodiment.

FIG. 10 is a flowchart illustrating an exemplary operation of an image capturing device in the second embodiment.

FIG. 11 is a diagram illustrating an example of an amount of variation in phases of a flicker component in the second embodiment.

MODE(S) FOR CARRYING OUT THE INVENTION

The description of the best modes for carrying out the present technology (referred to as an embodiment hereinafter) will be given. The description is given in the following order.

1. First Embodiment (example of shifting exposure start timing by fixed time interval in synchronization with vertical synchronization signal)
2. Second Embodiment (example of shifting exposure start timing by fixed time interval in synchronization with vertical synchronization signal having frequency of 50 hertz)

<1. First Embodiment>
[Exemplary Configuration of Image Capturing Device]

Figure 1:
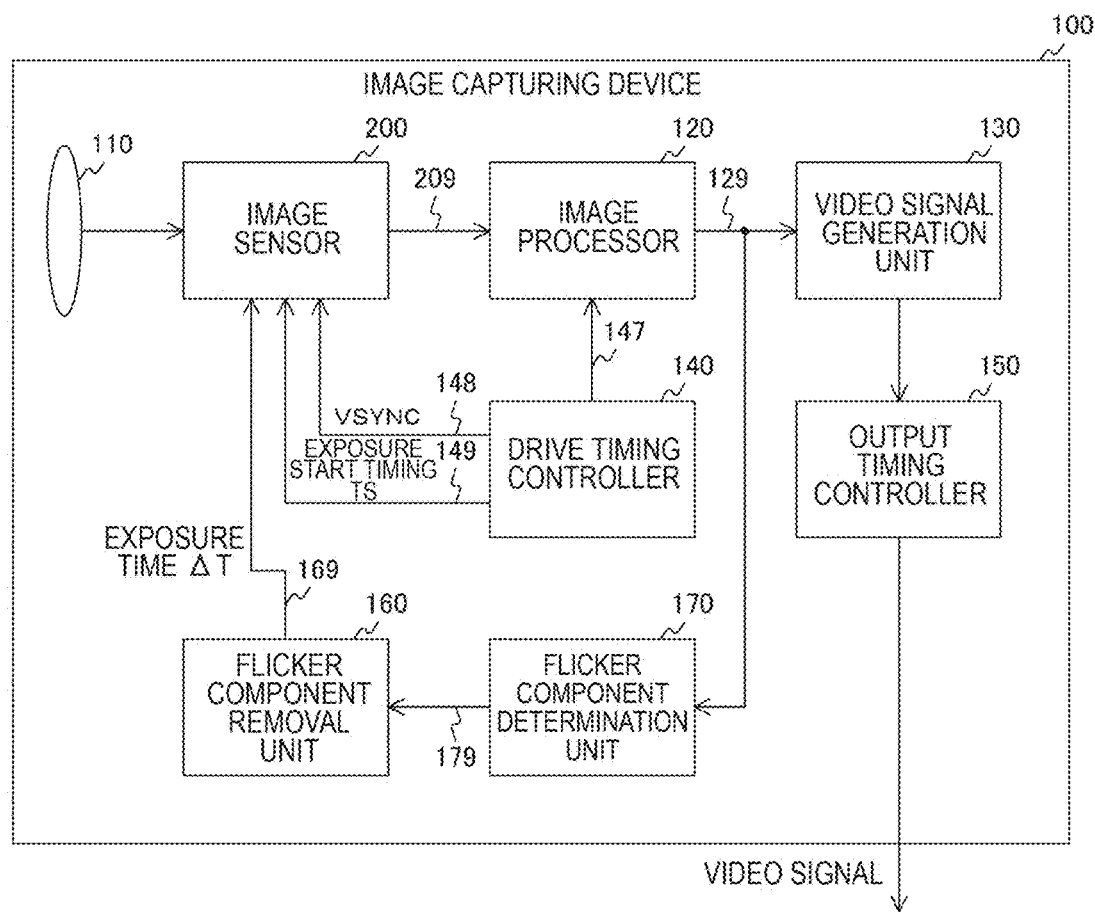
FIG. 1 is a block diagram illustrating an exemplary configuration of an image capturing device in a first embodiment.

FIG. 1 is a block diagram illustrating an exemplary configuration of an image capturing device 100 in a first embodiment. The image capturing device 100 is configured to include an image capturing lens 110, an image sensor 200, an image processor 120, a video signal generation unit 130, a drive timing controller 140, an output timing controller 150, a flicker component removal unit 160, and a flicker component determination unit 170.

The image capturing lens 110 is configured to condense light to form a subject image on a plane of the image sensor 200.

The image sensor 200 is configured to expose sequentially a plurality of lines, each of which includes a plurality of pixels at respective different timings to generate image data. The image sensor 200 receives a vertical synchronization signal VSYNC and an exposure start timing TS from the drive timing controller 140, and furthermore, receives an exposure time ΔT from the flicker component removal unit 160. In this regard, the vertical synchronization frequency signal VSYNC is a signal indicating timing of generating the image data. In one example, a signal having a frequency of 59.94 hertz (Hz), which conforms to the national television system committee (NTSC) standard, is used as the vertical synchronization signal. In the exposure start timing TS, a value representing a time span ranging from reference timing to the exposure start timing of a specific line (e.g. a line exposed at the beginning) is set. The reference timing is the rising or falling timing of the vertical synchronization signal VSYNC, in one example. In the exposure time ΔT, exposure time for each line is set. The units of the exposure start timing TS and the exposure time ΔT are millisecond (ms) or the number of pulses of a pulse signal of a predetermined frequency.

The image sensor 200 starts exposure of a first line from the exposure start timing TS. Furthermore, the image sensor 200 starts exposure of the second or subsequent lines when time of $1/f_h$ seconds elapses from time when exposure of the immediately preceding line starts. In this regard, $f_h$ is the horizontal synchronization frequency of a horizontal synchronization signal indicating the exposure start timing for each line. The image sensor 200 exposures each line over the exposure time ΔT, generates line data in sequence, and supplies it to the image processor 120 over a signal line 209. In this way, a technique of performing the exposure at different timing for each line is typically called a rolling shutter mode.

If the image sensor 200 operating in the rolling shutter mode performs image capture under a light source such as a fluorescent lamp that repeats flashing of light at a fixed frequency, a horizontal stripe is more likely to occur as described above. This horizontal stripe component is caused by flickering of the light source such as a fluorescent lamp, and thus is called a flicker component.

Furthermore, the image sensor 200 is assumed to generate image data in a progressive scan mode in which all the lines are scanned whenever a period P of the vertical synchronization signal VSYNC elapses. Moreover, the image sensor 200 may generate image data in an interlaced scan mode in which odd-numbered lines and even-numbered lines are scanned alternately whenever the period P elapses. In the progressive scan mode, image data including data of all the lines is generated in synchronization with the vertical synchronization signal VSYNC, and this image data is called a frame. On the other hand, in the interlaced scan mode, image data including data of odd or even numbered lines is generated in synchronization with the vertical synchronization signal VSYNC, and this image data is called a field.

The image processor 120 is configured to perform predetermined image processing on the image data (frame) from the image sensor 200. In one example, demosaicing or YC conversion processing is executed as the image processing. The demosaicing processing allows a color signal that is lacking in each pixel data including any of red (R), green (G), and blue (B) signals to be interpolated. Furthermore, the YC conversion processing allows red (R), green (G), and blue (B) signals to be converted into a luminance signal and a color-difference signal. The image processor 120 supplies image data subjected to image processing to the video signal generation unit 130 and the flicker component determination unit 170 over a signal line 129. Moreover, the image processor 120 may perform only one of the demosaicing and YC processing, or may further perform other image processing such as gamma correction or white balance correction processing.

The video signal generation unit 130 is configured to generate a video signal from the image data. The video signal generation unit 130 generates a signal obtained by adding a vertical synchronization signal to the luminance signal and the color-difference signal and supplies it to the output timing controller 150 as a video signal.

The drive timing controller 140 is configured to control drive timing of the image sensor 200. The drive timing controller 140 generates the vertical synchronization signal VSYNC and the exposure start timing TS, and supplies them to the image sensor 200 over a signal line 148 and a signal line 149, respectively. Furthermore, the drive timing controller 140 supplies image processing timing at which the image processing is performed to the image processor 120 over a signal line 147. In one example, timing that is synchronized with the exposure start timing is supplied as the image processing timing.

Furthermore, the drive timing controller 140 performs control so that the exposure start timing of each line is shifted by a fixed time interval (referred to as "shift amount S" hereinafter) whenever the period of the vertical synchronization signal VSYNC elapses.

In this regard, a frequency of 50 or 60 hertz (Hz) is typically used as the power frequency $f_p$. Furthermore, the vertical synchronization frequency $f_v$ is 59.94 hertz (Hz) in the NTSC standard. When the vertical synchronization frequency $f_v$ is set to a fixed value, the amount of variation in phases is determined using Formula (1) based on whether the power frequency $f_p$ is 50 or 60 hertz (Hz).

In one example, a case is assumed in which the vertical synchronization frequency $f_v$ is 59.94 hertz (Hz) and the power frequency $f_p$ is 60 hertz (Hz). In this case, the amount of variation in phases in a case where the exposure start timing is not shifted is calculated using the following formula based on Formula (1).

[Math. 2]

$$\Delta\theta_{60\ Hz,NTSC} = \left(2\pi \cdot \frac{2 \cdot 60}{59.94}\right) \bmod 2\pi \quad \text{Formula (2)}$$
$$\cong \left\{2\pi \cdot \left(2 + \frac{1}{500}\right)\right\} \bmod 2\pi = 2\pi \cdot \frac{1}{500}$$

From Formula (2), when there is no shift, the phase of a flicker component varies by only approximately 1/500 of the period P whenever the period P of the vertical synchronization signal VSYNC elapses. Thus, when there is no shift, 500 frames will be necessary for the phase of a flicker component to complete one cycle. However, if the drive timing controller 140 shifts the exposure start timing by the shift amount S for each frame, the phase of a flicker component varies by the shift amount S for each frame. In one example, if the shift amount S is P/10 (36 degrees) and the number of all the lines is 525, the phase varies by approximately 52.5 lines for each frame. Accordingly, a time span until the phase of a flicker component completes one cycle is reduced to a time span corresponding to the shift amount. In one example, if the shift amount is P/10, the phase of a flicker component completes one cycle through 10 frames.

A case is also assumed in which the power frequency $f_p$ is 50 hertz (Hz). In this case, the amount of variation in phases in the case where the exposure start timing is not shifted is calculated using the following formula based on Formula (1).

[Math. 3]

$$\Delta\theta_{50\ Hz,NTSC} = \left(2\pi \cdot \frac{2 \cdot 50}{59.94}\right) \bmod 2\pi \quad \text{Formula (3)}$$
$$\cong \left(2\pi \cdot \frac{5}{3}\right) \bmod 2\pi = 2\pi \cdot \frac{2}{3}$$

From Formula (3), when there is no shift, the phase varies by 2/3 (−120 degrees) of the period P whenever the period P of the vertical synchronization signal VSYNC elapses. Thus, even when there is no shift, the phase of a flicker component completes one cycle through three frames. In this way, in the case where the power frequency is 50 hertz (Hz) and the case where it is 60 hertz (Hz), their respective amounts of variation in phases are different when there is no shift. In this event, the amounts of variation in phases are preferably the same value for each frame after the shift even in the case of either power frequency. To achieve the same amount of variation in phases after the shift regardless of the power frequency, the shift amount S may be set to a value proportional to the larger one of the amounts of variation in phases obtained by Formulas (2) and (3). Thus, the shift amount S is preferably set to P/3 (120 degrees) or the like.

Moreover, the vertical synchronization frequency $f_v$ may be a frequency other than 59.94 hertz (Hz). In one example, the vertical synchronization frequency $f_v$ may be 60 hertz (Hz) or may be 30 hertz (Hz). In the case of this frequency, the amount of variation in phases is comparable to the value obtained by Formulas (2) and (3), and thus the shift amount S is preferably set to P/3 (120 degrees).

Moreover, the drive timing controller 140 is one example of a timing controller described in the claims.

The output timing controller 150 is configured to shift output timing of the image data in a video signal and output it to an external display device or the like. In this regard, an amount of shifting the output timing may be a difference between the period P of the vertical synchronization signal VSYNC and the shift amount S. This makes the output timing of the image data constant.

The flicker component removal unit 160 is configured to remove a flicker component from the image data when the flicker component determination unit 170 determines that the flicker component is present. If it is not determined that a flicker component is present, the flicker component removal unit 160 supplies the exposure time ΔT, which is set previously in accordance with the user's operation or the like, to the image sensor 200 over a signal line 169. On the other hand, if a flicker component is determined to be present, the flicker component removal unit 160 sets the exposure time ΔT to a time value that is an integer multiple of the period during the flashing of a light source (e.g. 1/100 seconds) and supplies it to the image sensor 200. The control of the exposure time ΔT allows the flicker component to be removed. Moreover, the flicker component removal unit 160 is one example of a removal unit described in the claims.

The flicker component determination unit 170 is configured to determine whether a flicker component is present. The flicker component determination unit 170 performs frequency analysis after the removal of a DC component from the image data, in one example. The description of the DC component will be given later. In this regard, a frequency of a flicker component is determined from the power frequency and a frequency of a horizontal synchronization signal HSYNC, and thus the frequency analysis makes it possible for the flicker component determination unit 170 to determine whether a flicker component is present. The flicker component determination unit 170 supplies a result obtained by the determination to the flicker component removal unit 160 over a signal line 179. Moreover, the flicker component removal unit 160 is one example of a determination unit described in the claims.

[Exemplary Configuration of Image Sensor]

Figure 2:
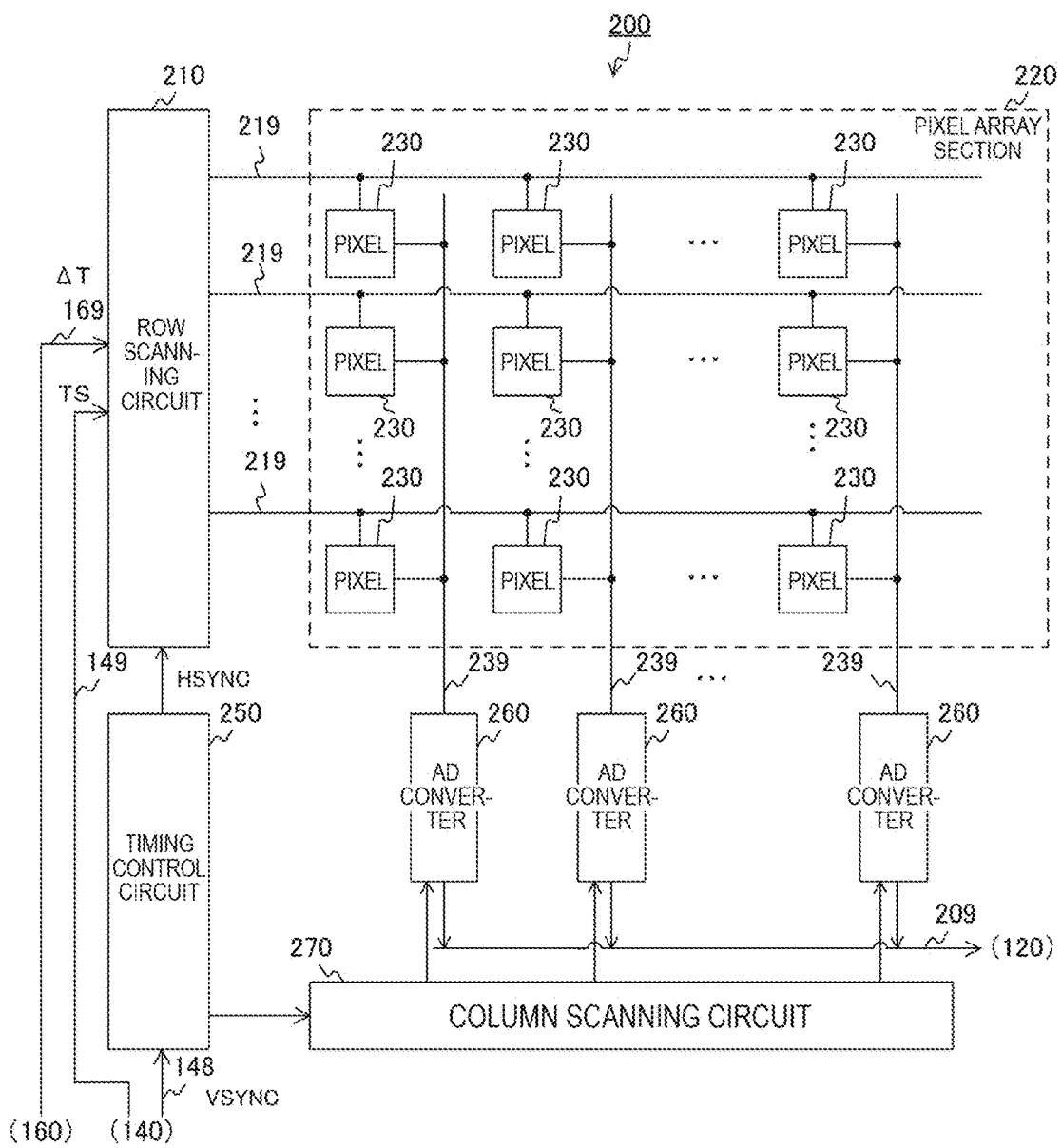
FIG. 2 is a block diagram illustrating an exemplary configuration of an image capturing device in a first embodiment.

FIG. 2 is a block diagram illustrating an exemplary configuration of the image sensor 200 in the first embodiment. The image sensor 200 is configured to include a row scanning circuit 210, a pixel array section 220, a timing control circuit 250, an analog to digital (AD) converter 260, and a column scanning circuit 270. The pixel array section 220 is composed of a plurality of pixels arranged in a two-dimensional grid.

The timing control circuit 250 is configured to control scanning timing of rows and columns. In this regard, the row is composed of a plurality of pixels 230 arranged in any one direction in the pixel array section 220, and is also called a line. Furthermore, the column is composed of the plurality of pixels 230 arranged in the direction perpendicular to the row in the pixel array section 220.

The timing control circuit 250 generates the horizontal synchronization signal HSYNC in synchronization with the vertical synchronization signal VSYNC and supplies it to the row scanning circuit 210. Furthermore, the timing control circuit 250 generates a timing signal indicating the timing for scanning the column in synchronization with the horizontal synchronization signal HSYNC and supplies it to the column scanning circuit 270.

The row scanning circuit 210 is configured to select each of rows (lines) in synchronization with the horizontal synchronization signal HSYNC. The row scanning circuit 210 selects a row by outputting a row selection signal to each of rows in sequence over a signal line 219.

Furthermore, the row scanning circuit 210 exposures each of the rows at different timings. The row scanning circuit 210 starts a long exposure of the first row at the exposure start timing TS. The second and the subsequent long exposures are started when a time of $1/f_h$ seconds from the start of exposure of the immediately preceding row elapses. Then, the row scanning circuit 210 terminates the exposure of the row when the exposure time ΔT from the start of exposure of each row elapses.

The pixel 230 is configured to generate a pixel signal of a potential corresponding to an exposure time. The pixel 230 supplies the generated pixel signal to the AD converter 260 over a signal line 239.

The AD converter 260 is configured to analog-to-digital convert the pixel signal to generate pixel data. The AD converter 260 is provided for each column. The AD converter 260 of a column selected by the column scanning circuit 270 supplies the generated pixel data to the image processor 120. Moreover, although the AD converter 260 is configured to be provided in the image sensor 200, the AD converter 260 may be provided to the outside of the image sensor 200.

The column scanning circuit 270 is configured to select each of the columns in accordance with control by the timing control circuit 250. The column scanning circuit 270 selects a column by outputting a column selection signal to each of the AD converters 260 in sequence.

[Exemplary Configuration of Flicker Component Determination Unit]

Figure 3:
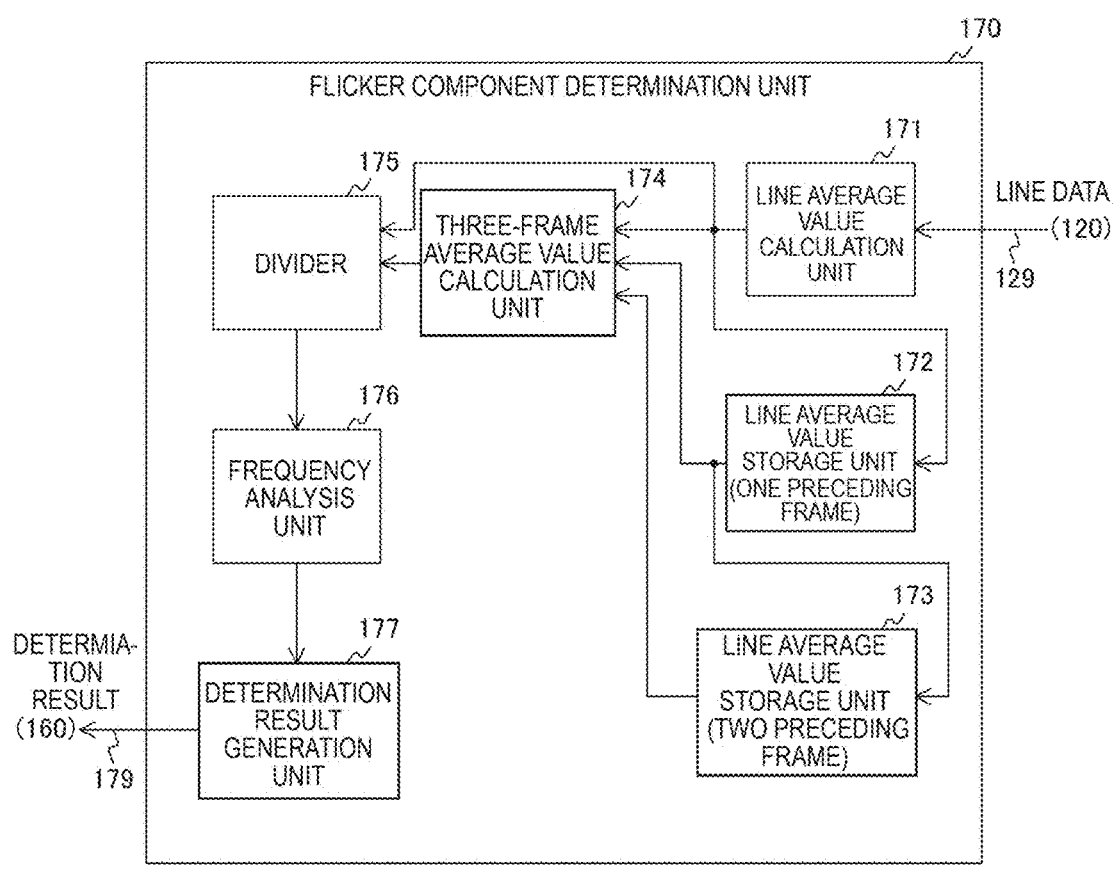
FIG. 3 is a block diagram illustrating an exemplary configuration of a flicker component determination unit in the first embodiment.

FIG. 3 is a block diagram illustrating an exemplary configuration of the flicker component determination unit 170 in the first embodiment. The flicker component determination unit 170 is configured to include a line average value calculation unit 171, line average value storage units 172 and 173, a three-frame average value calculation unit 174, a divider 175, a frequency analysis unit 176, and a determination result generation unit 177.

The line average value calculation unit 171 is configured to calculate an average value of the pixel data for each line. In one example, in a case where the number of lines in the image data is 525, 525 average values are calculated for each image data. The line average value calculation unit 171 sets the calculated average value to a line average value Ys and supplies it to the line average value storage unit 172 and the three-frame average value calculation unit 174.

The line average value storage unit 172 is configured to store the line average value Ys for one frame. The line average value Ys stored in the line average value storage unit 172 is set to a line average value Ys of a frame preceding the current frame by one frame and is supplied to the line average value storage unit 173 and the three-frame average value calculation unit 174.

The line average value storage unit 173 is configured to store the line average value Ys for one frame. The line average value Ys stored in the line average value storage unit 173 is set to a line average value Ys of a frame preceding the current frame by two frames and is supplied to the line average value storage unit 173 and the three-frame average value calculation unit 174.

The three-frame average value calculation unit 174 is configured to calculate an average value for three frames of the line average value Ys for each line. The three-frame average value calculation unit 174 sets the calculated average value to a DC component Is and supplies it to the divider 175. In this regard, the DC component is a component indicating an original shading of a subject, in which the influence of a flicker component is excluded. Moreover, the three-frame average value calculation unit 174 is one example of an average value calculation unit described in the claims.

The divider 175 is configured to divide the line average value Ys of the current frame by a DC component Is of a corresponding line. The divider 175 supplies the divided value to the frequency analysis unit 176.

Here, the line average value of y lines in n frames Ys(y, n) is represented by the following formula.

[Math. 4]

$$Ys(y, n) = Is(y)\left\{1 + A \cdot \sin\left(2\pi 2 f_p\left(\frac{y}{f_h} + \frac{n}{f_v}\right)\right)\right\} \quad \text{Formula (4)}$$

In the above formula, Is(y) represents the DC component of y lines, and A represents the magnitude of a flicker component. In the above formula, $f_h$ represents the horizontal synchronization frequency of the horizontal synchronization signal HSYNC, and $f_v$ represents the vertical synchronization frequency of the vertical synchronization signal VSYNC. Furthermore, in the above formula, $f_p$ represents the power frequency.

In Formula (4), the left-hand side is calculated by the line average value calculation unit 171. Furthermore, the DC component Is(y) in the left-hand side is calculated by the three-frame average value calculation unit 174. The division of the left-hand side by the DC component Is(y) generates a signal in which the influence of a DC component is excluded.

The frequency analysis unit 176 is configured to analyze a frequency of a signal of the divided value. The frequency analysis unit 176 analyzes a frequency by performing the Fourier transform or the like on the signal of a divided value, generates a frequency distribution indicating the amplitude of each of a plurality of components having different frequencies in the signal, and supplies it to the determination result generation unit 177.

From Formula (4), a frequency of a flicker component is a value proportional to $2f_p/f_h$. The horizontal synchronization frequency $f_h$ is a fixed value (e.g. 15.75 kilohertz) during image capture, and thus the frequency of a flicker component is either a frequency corresponding to the 50-hertz (Hz) power frequency or a frequency corresponding to the 60-hertz (Hz) power frequency.

The determination result generation unit 177 is configured to determine whether a flicker component is present in the image data to generate a determination result. The determination result generation unit 177 determines whether a flicker component is present depending on whether a dominant component in the frequency distribution (e.g. a component having the largest amplitude) is the frequency of a flicker component. The determination result generation unit 177 supplies the generated determination result to the flicker component removal unit 160.

[Exemplary Operation of Image Capturing Device]

Figure 4:
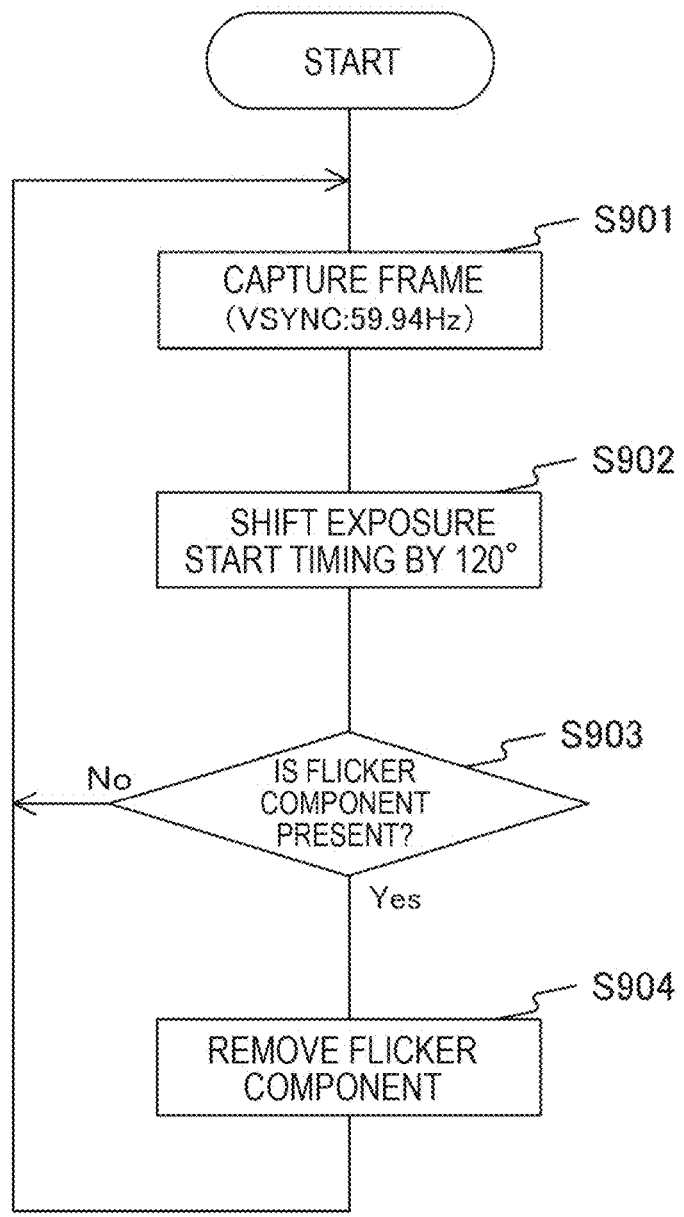
FIG. 4 is a flowchart illustrating an exemplary operation of the image capturing device in the first embodiment.

FIG. 4 is a flowchart illustrating an exemplary operation of the image capturing device in the first embodiment. This operation is started when a predetermined operation for capturing a moving image (e.g. depression of a record button) is performed, in one example.

The image capturing device 100 captures image data (frame) in synchronization with the vertical synchronization signal VSYNC of 59.94 Hz (step S901). Then, the image capturing device 100 shifts the exposure start timing TS by ⅓ (i.e. 120 degrees) of the period P of the vertical synchronization signal VSYNC (step S902). Furthermore, the image capturing device 100 determines whether a flicker component is present (step S903). If it is determined that a flicker component is present (Yes in step S903), the image capturing device 100 removes the flicker component by controlling the exposure time or the like (step S904). On the other hand, if it is not determined that a flicker component is present (No in step S903) or after step S904, the image capturing device 100 returns to step S901.

Figure 5:
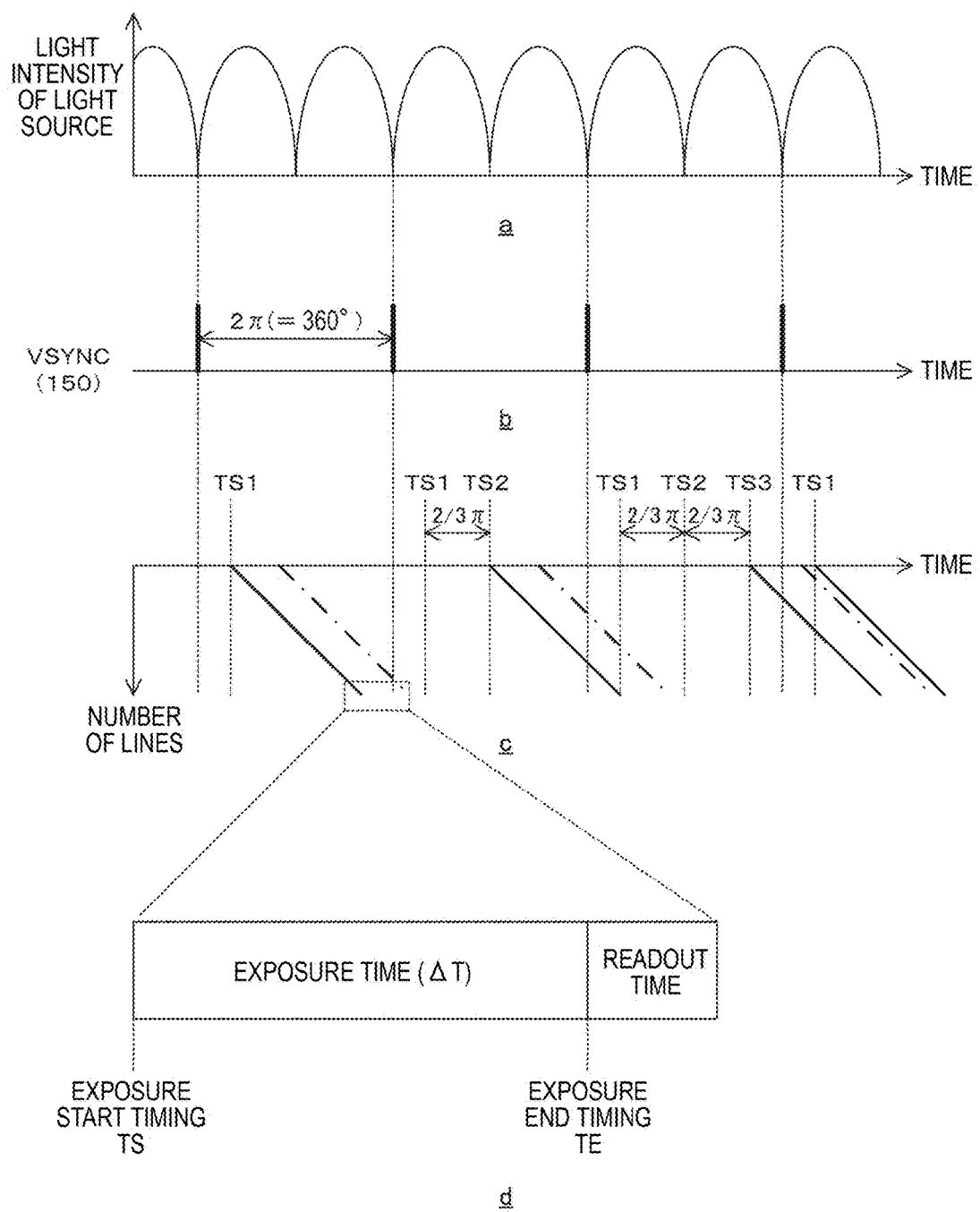
FIG. 5 is a timing chart illustrating an exemplary operation of the image capturing device in the first embodiment.

FIG. 5 is a timing chart illustrating an exemplary operation of the image capturing device 100 in the first embodiment. In this timing chart, the portion a is a view illustrating an example of fluctuation in the light intensity of a light source of light to be condensed by the image capturing lens 110. In the portion a in this timing chart, the vertical axis is light intensity and the horizontal axis is time. As illustrated in the portion a in this timing chart, the light source repeats flashing of light at a fixed frequency. This frequency is equivalent to twice the power frequency of a power supply for supplying power to the light source.

In FIG. 5, the portion b is a view illustrating an example of the vertical synchronization signal VSYNC. In the portion a in this timing chart, the vertical axis is a value of the vertical synchronization signal VSYNC and the horizontal axis is time. As illustrated in the portion a in this timing chart, the vertical synchronization frequency of the vertical synchronization signal VSYNC is comparable to the power frequency.

In FIG. 5, a portion c is a view illustrating an example of the exposure timing of the image sensor 200. In this view, the vertical axis is a position of a line and the horizontal axis is time. Furthermore, in the portion a in this timing chart, the thick line indicates exposure start timing for each line and the alternate long and short dash line indicates exposure end timing for each line. As described above, the image capturing device 100 shifts exposure start timing of each line by ⅓ (i.e. 120 degrees) of the period P of the vertical synchronization signal VSYNC for each frame. In one example, if the exposure start timing of the first row in a frame F1 is set to TS1, the exposure start timing TS2 of the first line in the subsequent frame F2 is controlled to be timing that is shifted by P/3 (120 degrees) with respect to the exposure start timing TS1. Furthermore, the exposure start timing TS3 of the first line of a frame F3 following the frame F2 is controlled to be timing that is shifted by P/3 (120 degrees) with respect to the exposure start timing TS2. The exposure start timing of the first line of a frame F4 following the frame F3 is controlled to be the same exposure start timing TS1 as the frame F1.

In FIG. 5, the portion d is a view obtained by expanding a portion of the exposure time in the portion c of FIG. 5. As illustrated in the portion d in this timing chart, the exposure of a ling is terminated at the exposure end timing TE in which the exposure time ΔT from the exposure start timing elapses. Then, the line data of the line is read out at readout time. In the portion c in this timing chart, the readout time is omitted.

Figure 6:
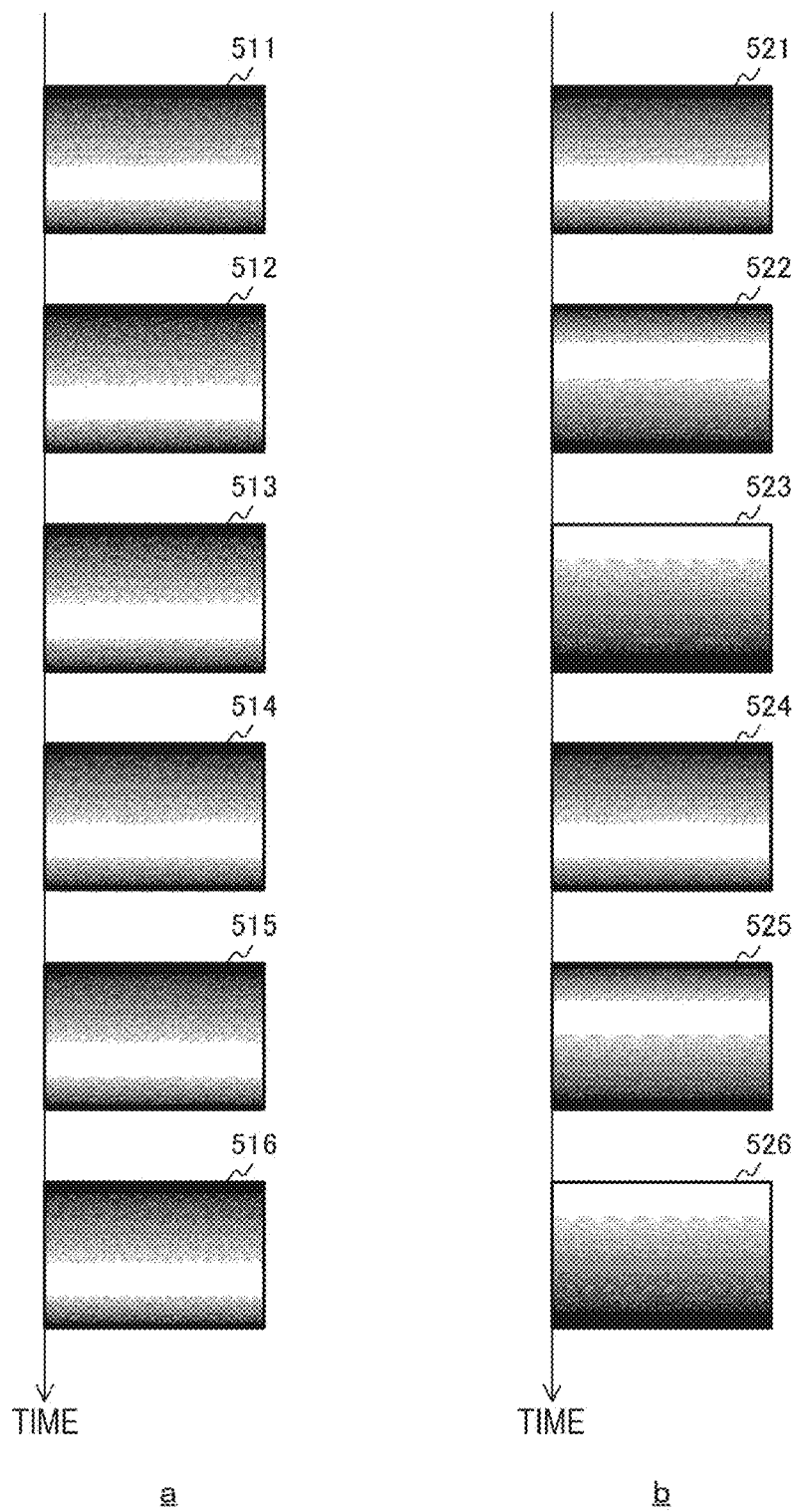
FIG. 6 is a diagram illustrating an example of a flicker component corresponding to the power frequency of 60 hertz in the first embodiment.

FIG. 6 is a diagram illustrating an example of a flicker component when the power frequency is 60 hertz (Hz) in the first embodiment. In this figure, the portion a is a view illustrating an example of a flicker component corresponding to the power frequency of 60 hertz (Hz) in a case where the exposure start timing is not shifted. Frames 511, 512, 513, 514, 515, and 516 are assumed to be captured in time series without shifting the exposure start timing. In these frames, shading, that is, a horizontal stripe occurs along the direction perpendicular to a line due to flickering of a light source. A component of the horizontal stripe corresponds to a flicker component to be removed. A phase in which a flicker component becomes a reference value (e.g. peak value) varies for each frame. The amount of variation in phases is very small, which necessitates approximately 500 frames for the phase to complete one cycle. Moreover, although the image data typically includes an original shading component of a subject in addition to a flicker component, the shading component other than a flicker component is omitted in FIG. 6.

In FIG. 6, the portion b is a view illustrating an example of a flicker component corresponding to the power frequency of 60 hertz (Hz) in a case where the exposure start timing is shifted for each frame. Frames 521, 522, 523, 524, 525, and 526 are assumed to be captured in time series while shifting the exposure start timing. In these frames, a position in a frame of a predetermined line (e.g. line having the highest luminance) in the flicker component, that is, a phase varies by the shift amount S of the exposure start timing for each frame. If the shift amount S is set to ⅓ (120 degrees) of the period P of the vertical synchronization signal VSYNC, the position of the flicker component in the image data, that is, the phase varies for each frame and the phase completes one cycle through three frames. In one example, the phase of the flicker component in the frame 524 is similar to that of the frame 521 preceding the frame 524 by three frames. In this way, by shifting the exposure start timing by 120 degrees for each frame, the phase of the flicker component varies for each frame and completes one cycle through three frames. Thus, it is possible to detect a flicker component in as little as short time through three frames in the shortest time.

Figure 7:
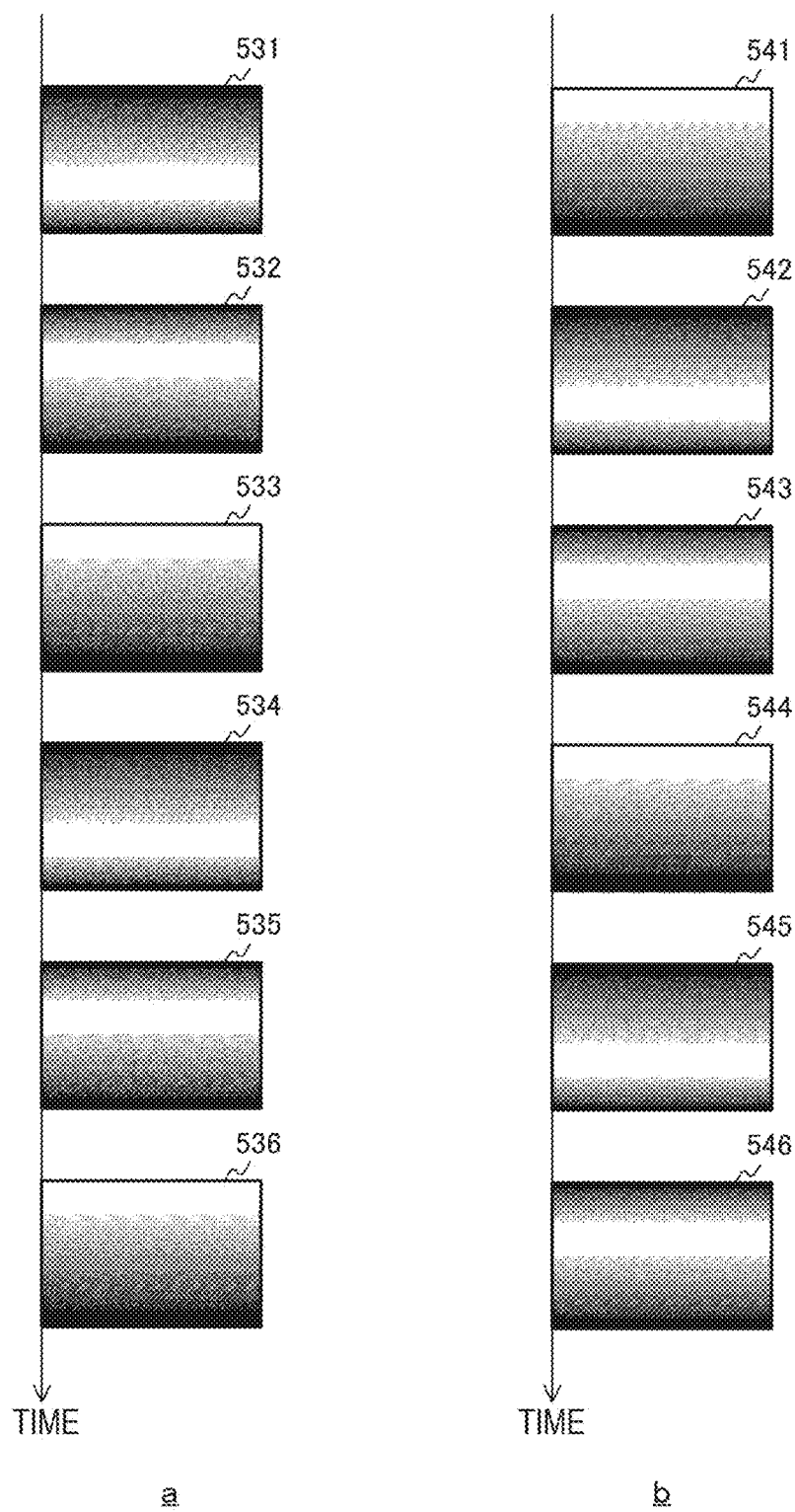
FIG. 7 is a diagram illustrating an example of a flicker component corresponding to the power frequency of 50 hertz in the first embodiment.

FIG. 7 is a diagram illustrating an example of a flicker component when the power frequency is 60 hertz (Hz) in the first embodiment. In this figure, the portion a is a view illustrating an example of a flicker component corresponding to the power frequency of 50 hertz (Hz) in a case where the exposure start timing is not shifted. Frames 531, 532, 533, 534, 535, and 536 are assumed to be captured in time series without shifting the exposure start timing. In these frames, a phase of a flicker component varies by ⅔ of the period P of the vertical synchronization signal VSYNC for each frame. In one example, the phase of the flicker component in the frame 534 is similar to that of the frame 531 preceding the frame 534 by three frames.

In FIG. 7, the portion b is a view illustrating an example of a flicker component corresponding to the power frequency of 50 hertz (Hz) in a case where the exposure start timing is shifted for each frame. Frames 541, 542, 543, 544, 545, and 546 are assumed to be captured in time series while shifting the exposure start timing. In this figure, as illustrated in the portion a, the phase of the flicker component varies by P/3 (120 degrees) for each frame in a state of no shift. Thus, if the exposure start timing is shifted by the same amount (P/3) for each frame, the phase completes its cycle only through three frames, which is substantially similar to the case of no shift. In FIG. 7, a shading component other than a flicker component is omitted.

As illustrated in FIGS. 6 and 7, if a shift amount is set to an amount (120 degrees) proportional to the amount of variation in phases of a flicker component corresponding to the power frequency of 50 hertz (Hz), the amounts of variation in phases of a flicker component become the same values regardless of the power frequency. Thus, even when the power frequency is either 50 hertz (Hz) or 60 hertz (Hz), the image capturing device 100 can determine whether a flicker component is present using the same algorithm.

FIG. 8 is a diagram illustrating an example of an amount of variation in phases of a flicker component in the first embodiment. In this figure, the portion a is a diagram showing an example of an amount of variation in phases of a flicker component corresponding to the power frequency of 50 hertz (Hz). In this figure, the phase of the flicker component of the frame F1 is set to the reference timing, and the amount of variation in phases of a frame other than the frame F1 with respect to the reference timing is denoted by an angle. In a case where the exposure start timing is not shifted, the phase of the frame F2 following the frame F1 varies by −120 degrees from the reference timing, in one example. Then, the phase of the subsequent frame F3 varies further by −120 degrees from the frame F2, and thus becomes +120 degrees with respect to the reference timing. The phase of the subsequent frame F4 varies further by −120 degrees from the frame F3, and returns to the reference timing. The phases of the frames F5 and F6 are similar to those of the frames F2 and F3, respectively.

Meanwhile, in a case where the exposure start timing is shifted by 120 degrees, the phase of the frame F2 varies by +120 degrees from the reference timing, in one example. Then, the phase of the subsequent frame F3 varies further by +120 degrees from the frame F2, and thus becomes −120 degrees with respect to the reference timing. The phase of the subsequent frame F4 varies further by +120 degrees from the frame F3, and returns to the reference timing.

The portion b in FIG. 8 is a view illustrating an example of an amount of variation in phases of a flicker component corresponding to the power frequency of 60 hertz (Hz). In a case where the exposure start timing is not shifted, the phase of a predetermined line of a flicker component of each of the frames F2 to F6 does not vary with respect to the reference timing.

On the other hand, in a case where the exposure start timing is shifted by 120 degrees, the phase of the frame F2 varies by −120 degrees from the reference timing, in one example. Then, the phase of the subsequent frame F3 varies further by −120 degrees from the frame F2, and thus it becomes −120 degrees with respect to the reference timing. The phase of the subsequent frame F4 varies further by −120 degrees from the frame F3, and thus it returns to the reference timing. The phases of the frames F5 and F6 are similar to those of the frames F2 and F3, respectively.

As illustrated in FIG. 8, by setting the shift amount to 120 degrees, even when the power frequency is either 50 hertz or 60 hertz, the amount of variation in phases of a flicker component for each frame becomes 120 degrees.

In this way, according to the first embodiment of the present technology, the image capturing device 100 shifts the exposure start timing of each line by a fixed time interval whenever the period of a vertical synchronization signal elapses, and thus the phase of a flicker component varies by a fixed time interval for each frame. This makes it possible for the image capturing device 100 to perform determination of whether a flicker component is present with ease and in a short time.

<2. Second Embodiment>
[Exemplary Configuration of Image Capturing Device]

In the first embodiment, the image capturing device 100 performs image capture in synchronization with the vertical synchronization signal VSYNC of 59.94 hertz (Hz), which conforms to the NTSC standard. However, the image capturing device 100 may be configured to perform image capture in synchronization with the vertical synchronization signal VSYNC of 50 hertz (Hz), which conforms to the phase alternating line (PAL) standard. The second embodiment is different from the first embodiment in that the image capturing device 100 according to the second embodiment performs image capture in synchronization with the vertical synchronization signal VSYNC conforming to the PAL standard.

A case is assumed in which the vertical synchronization frequency $f_v$ is 50 hertz (Hz) and the power frequency $f_p$ is 50 hertz (Hz). In this case, the amount of variation in phases in a case where the exposure start timing is not shifted is calculated using the following formula based on Formula (1).

[Math. 5]

$$\Delta\theta_{50\,Hz,PAL} = \left(2\pi \cdot \frac{2 \cdot 50}{50}\right) \mod 2\pi \qquad \text{Formula (5)}$$
$$\cong (2\pi \cdot 2) \mod 2\pi = 0$$

From the above formula, when there is no shift, the phase of a flicker component does not vary. However, the drive timing controller 140 shifts the exposure start timing by the shift amount S for each frame, and thus the phase of a flicker component varies by the number of lines corresponding to the shift amount for each frame.

Furthermore, a case is assumed in which the vertical synchronization frequency $f_v$ is 50 hertz (Hz) and the power frequency $f_p$ is 60 hertz (Hz). In this case, the amount of variation in phases in a case where there is no shift is calculated using the following formula based on Formula (1).

[Math. 6]

$$\Delta\theta_{60\,Hz,PAL} = \left(2\pi \cdot \frac{2 \cdot 60}{50}\right) \mod 2\pi \qquad \text{Formula (6)}$$
$$\cong \left(2\pi \cdot \frac{12}{5}\right) \mod 2\pi = 2\pi \cdot \frac{2}{5}$$

From the above formula, when there is no shift, the phase varies by ⅖ (i.e. 144 degrees) of the period P of the vertical synchronization signal VSYNC whenever the period P elapses. Thus, even when there is no shift, the phase of a flicker component completes one cycle through five frames. In this way, in the case where the power frequency is 50 hertz (Hz) and the case where it is 60 hertz (Hz), their respective amounts of variation in phases are different when there is no shift. In this event, the amounts of variation in phases are preferably the same value for each frame after the shift even in the case of either power frequency. To achieve the same amount of variation after the shift regardless of the power frequency, the shift amount S may be set to a value proportional to larger one of the amounts of variation in phases obtained by Formulas (5) and (6). Thus, the shift amount S is preferably set to P/5 (72 degrees) or the like.

The second embodiment is different from the first embodiment in that the drive timing controller 140 according to the second embodiment supplies the vertical synchronization signal VSYNC of 50 hertz (Hz) to the image sensor 200 and shifts the exposure start timing by P/5 for each frame. Furthermore, the second embodiment is different from the first embodiment in that the second embodiment includes a flicker component determination unit 180 instead of the flicker component determination unit 170.

Figure 9:
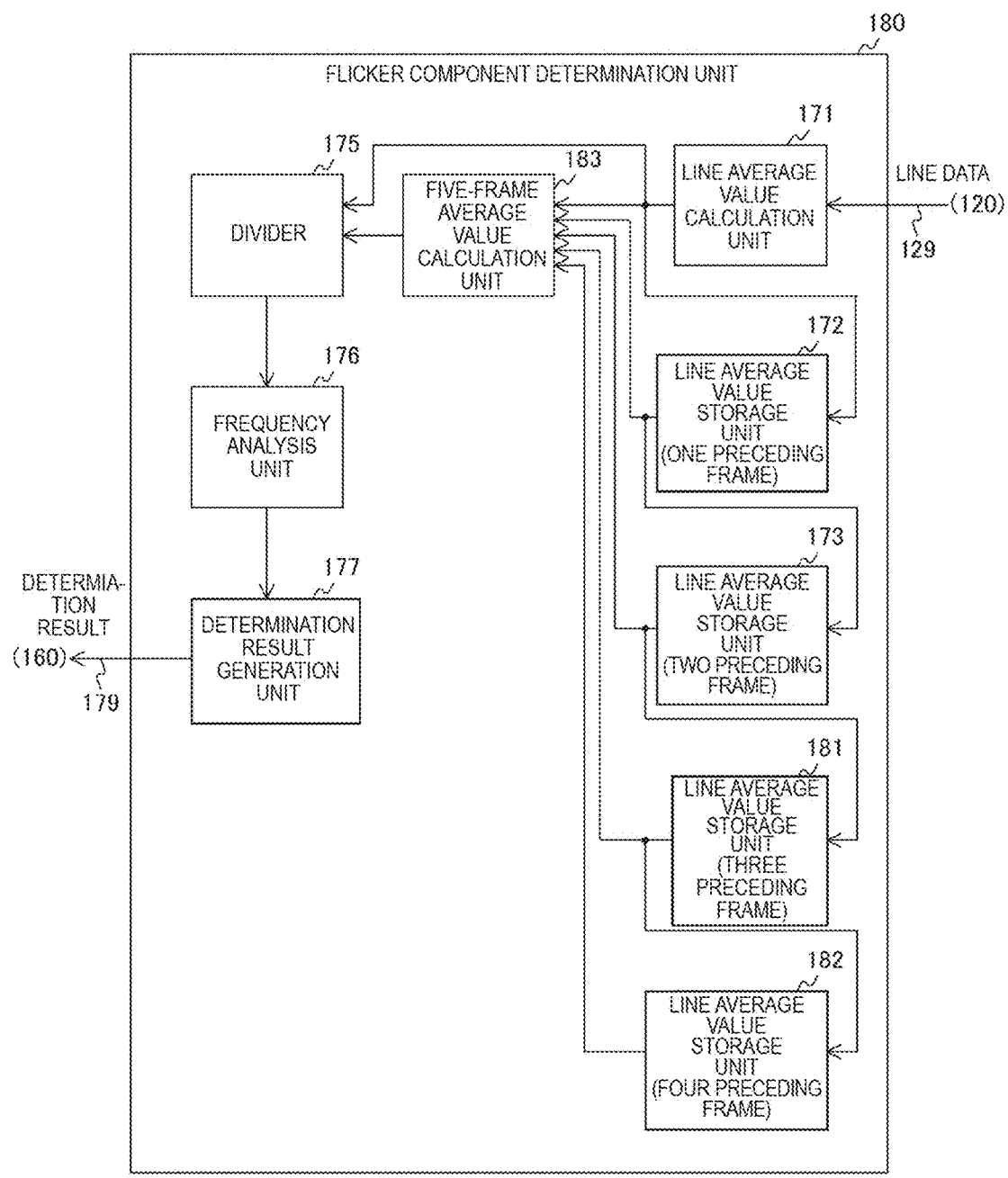
FIG. 9 is a block diagram illustrating an exemplary configuration of a flicker component determination unit in a second embodiment.

FIG. 9 is a block diagram illustrating an exemplary configuration of the flicker component determination unit 180 in the second embodiment. The second embodiment is different from the first embodiment in that the flicker component determination unit 180 according to the second embodiment is configured to further include a line average value storage units 181 and 182 and is configured to include a five-frame average value calculation unit 183 instead of the three-frame average value calculation unit 174.

A line average value Ys of a frame preceding the current frame by two frames is supplied to the line average value storage unit 173 in addition to the five-frame average value calculation unit 183.

The line average value storage unit 181 is configured to store a line average value for one frame. The line average value stored in the line average value storage unit 181 is set to a line average value Ys of a frame preceding the current frame by three frames and it is supplied to the line average value storage unit 182 and the five-frame average value calculation unit 183.

The line average value storage unit 182 is configured to store a line average value for one frame. The line average value stored in the line average value storage unit 182 is set to a line average value of a frame preceding the current frame by four frames and it is supplied to the five-frame average value calculation unit 183.

The five-frame average value calculation unit 183 is configured to calculate an average value Ys of a line average value for five frames for each line. The five-frame average value calculation unit 183 sets the calculated average value to a DC component Is and supplies it to the divider 175. Moreover, the five-frame average value calculation unit 183 is one example of an average value calculation unit described in the claims.

FIG. 10 is a flowchart illustrating an exemplary operation of the image capturing device 100 in the second embodiment. The second embodiment is different from the first embodiment in that the operation of the image capturing device 100 according to the second embodiment executes steps S905 and S906 instead of steps S901 and S902, respectively.

The image capturing device 100 captures image data (frame) in synchronization with the vertical synchronization signal VSYNC of 50 Hz (step S905). Then, the image capturing device 100 shifts the exposure start timing by P/5 (i.e. 72 degrees) (step S906).

FIG. 11 is a diagram illustrating an example of an amount of variation in phases of a flicker component in the second embodiment. In this figure, the portion a is a diagram showing an example of an amount of variation in phases of a flicker component corresponding to the power frequency of 50 hertz (Hz). In this figure, the phase of the flicker component of the frame F1 is set to the reference timing, and the amount of variation in phases of a frame other than the frame F1 with respect to the reference timing is denoted by an angle. In a case where the exposure start timing is not shifted, the phase of a predetermined line of a flicker component of each of the frames F2 to F6 does not vary with respect to the reference timing.

On the other hand, in a case where the exposure start timing is shifted by 72 degrees, the phase of the frame F2 varies by −72 degrees from the reference timing, in one example. Then, the phase of the subsequent frame F3 varies further by −72 degrees from the frame F2, and becomes −114 degrees with respect to the reference timing. The phases of the frame F4 and frame F5 are respectively −216 degrees and −288 degrees, and the phase in the frame F6 returns to the reference timing.

The portion b in FIG. 11, the portion a in this figure, is a view illustrating an example of an amount of variation in phases of a flicker component corresponding to the power frequency of 60 hertz (Hz). The phase of the frame F2 in a case where the exposure start timing is not shifted varies by +144 degrees from the reference timing, in one example. Then, the phase of the subsequent frame F3 varies further by +144 degrees from the frame F2, and becomes +288 degrees with respect to the reference timing. The phases of the frame F4 and frame F5 are respectively +72 degrees and +216 degrees, and the phase in the frame F6 returns to the reference timing.

On the other hand, in a case where the exposure start timing is shifted by 72 degrees, the phase of the frame F2 varies by +72 degrees from the reference timing, in one example. Then, the phase of the subsequent frame F3 varies further by +72 degrees from the frame F2, and becomes +114 degrees with respect to the reference timing. The phases of the frame F4 and frame F5 are respectively +216 degrees and +288 degrees, and the phase in the frame F6 returns to the reference timing.

As illustrated in FIG. 11, by setting the shift amount to 72 degrees, even when the power frequency is either 50 hertz or 60 hertz, the amount of variation in phases of a flicker component between frames becomes 72 degrees.

In this way, according to the second embodiment of the present technology, the exposure start timing for each line is shifted by a fixed time interval whenever the period of the vertical synchronization signal VSYNC of 50 hertz elapses. Thus, it is possible to detect a flicker component in a short time when the vertical synchronization signal is 50 hertz.

[First Modification]

Although the image capturing device 100 performs image capture in synchronization with the vertical synchronization signal of 50 hertz (Hz) in the second embodiment, the vertical synchronization frequency $f_v$ may be switched to 59.94 hertz (Hz) in accordance with the user's operation or the like. The first modification of the second embodiment is different from the first embodiment in that an image capturing device 100 according to the first modification switches the vertical synchronization frequency $f_v$.

Figure 12:
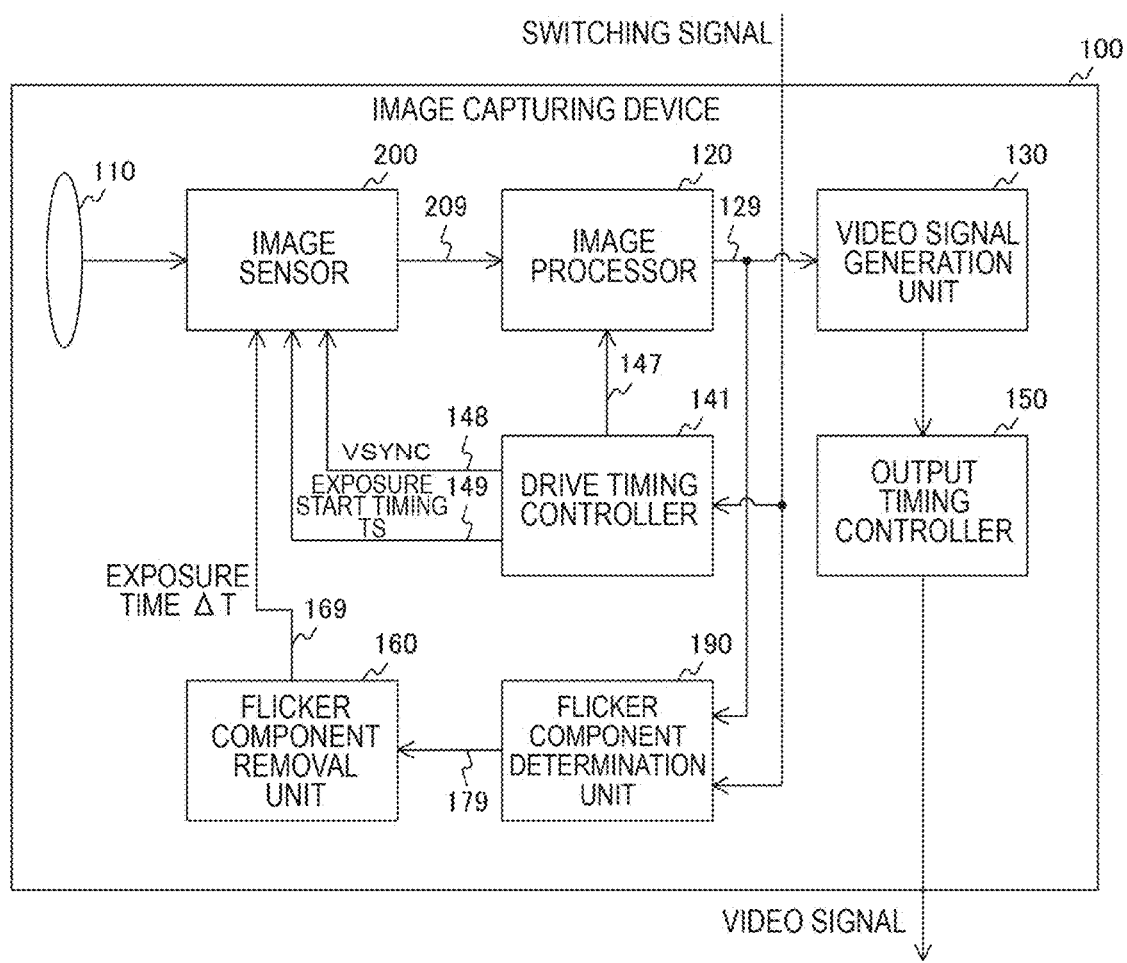
FIG. 12 is a block diagram illustrating an exemplary configuration of an image capturing device according to a first modification of the second embodiment.

FIG. 12 is a block diagram illustrating an exemplary configuration of the image capturing device 100 according to the first modification of the second embodiment. The first modification is different from the second embodiment in that the image capturing device 100 according to the first modification is configured to include a drive timing controller 141 and a flicker component determination unit 190 instead of the drive timing controller 140 and the flicker component determination unit 180, respectively.

The drive timing controller 141 switches the vertical synchronization frequency $f_v$ in accordance with a switching signal used to instruct the drive timing controller 141 to switch the vertical synchronization frequency $f_v$, which is different from the first embodiment. The switching signal is generated in accordance with the user's operation, in one example, and the switching signal instructs that the vertical synchronization frequency $f_v$ is switched to any one of 50 hertz and 59.94 hertz. Then, the drive timing controller 141, when switching its frequency to 59.94 hertz, sets the shift amount to 120 degrees, which is similar to the first embodiment, and, when switching its frequency to 50 hertz, set the shift amount to 72 degrees.

The flicker component determination unit 190 determines whether a flicker component is present in accordance with the switching signal by changing the algorithm, which is different from the first embodiment.

Figure 13:
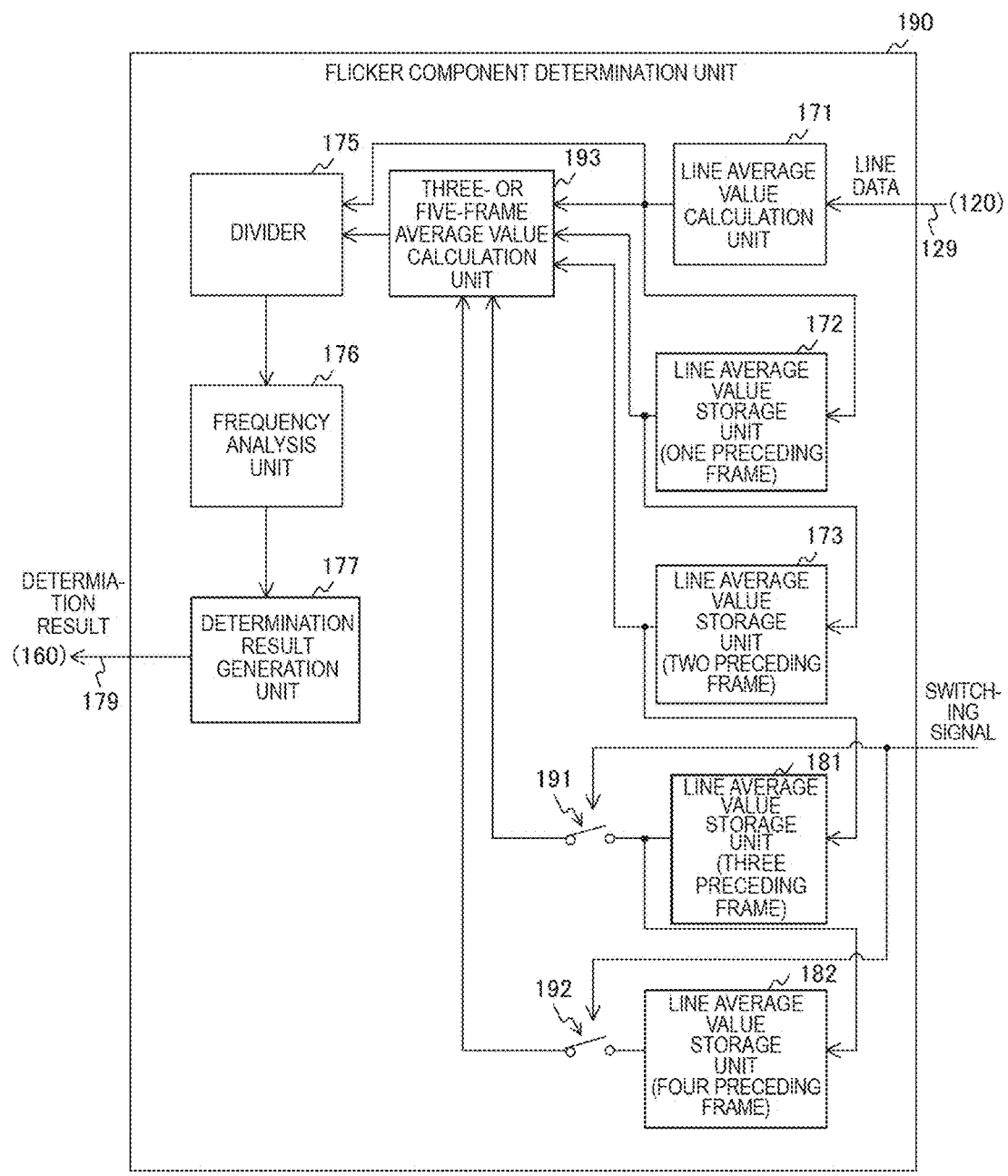
FIG. 13 is a block diagram illustrating an exemplary configuration of a flicker component determination unit according to the first modification of the second embodiment.

FIG. 13 is a block diagram illustrating an exemplary configuration of the flicker component determination unit 190 according to the first modification of the second embodiment. The flicker component determination unit 190 according to the first modification is configured to further include switches 191 and 192 and include a three- or five-frame average value calculation unit 193 instead of the five-frame average value calculation unit 183, which is different from the second embodiment.

The switch 191 is configured to open and close a path between the line average value storage unit 181 and the three- or five-frame average value calculation unit 193 in accordance with the switching signal. In one example, when the vertical synchronization frequency $f_v$ is switched to 50 hertz, the switch 191 performs transition to the closed state. When the vertical synchronization frequency $f_v$ is switched to 59.94 hertz, the switch 191 performs transition to the open state.

The switch 192 is configured to open and close a path between the line average value storage unit 182 and the three- or five-frame average value calculation unit 193 in accordance with the switching signal. In one example, when the vertical synchronization frequency $f_v$ is switched to 50 hertz, the switch 192 performs transition to the closed state. When the vertical synchronization frequency $f_v$ is switched to 59.94 hertz, the switch 192 performs transition to the open state.

The three- or five-frame average value calculation unit 193 is configured to calculate an average value of a line average value for each line for three frames or five frames.

In this way, according to the first modification of the second embodiment, the image capturing device 100 performs image capture by switching the vertical synchronization frequency $f_v$, and thus it is possible to determine whether a flicker component is present even when the vertical synchronization frequency $f_v$ varies.

[Second Modification]

Although the image capturing device 100 removes a flicker component by controlling the exposure time in the second embodiment, it is also possible to remove a flicker component by controlling a gain to the image data. The image capturing device 100 according to the second modification of the second embodiment removes a flicker component by controlling a gain with respect to the image data, which is different from the second embodiment.

Figure 14:
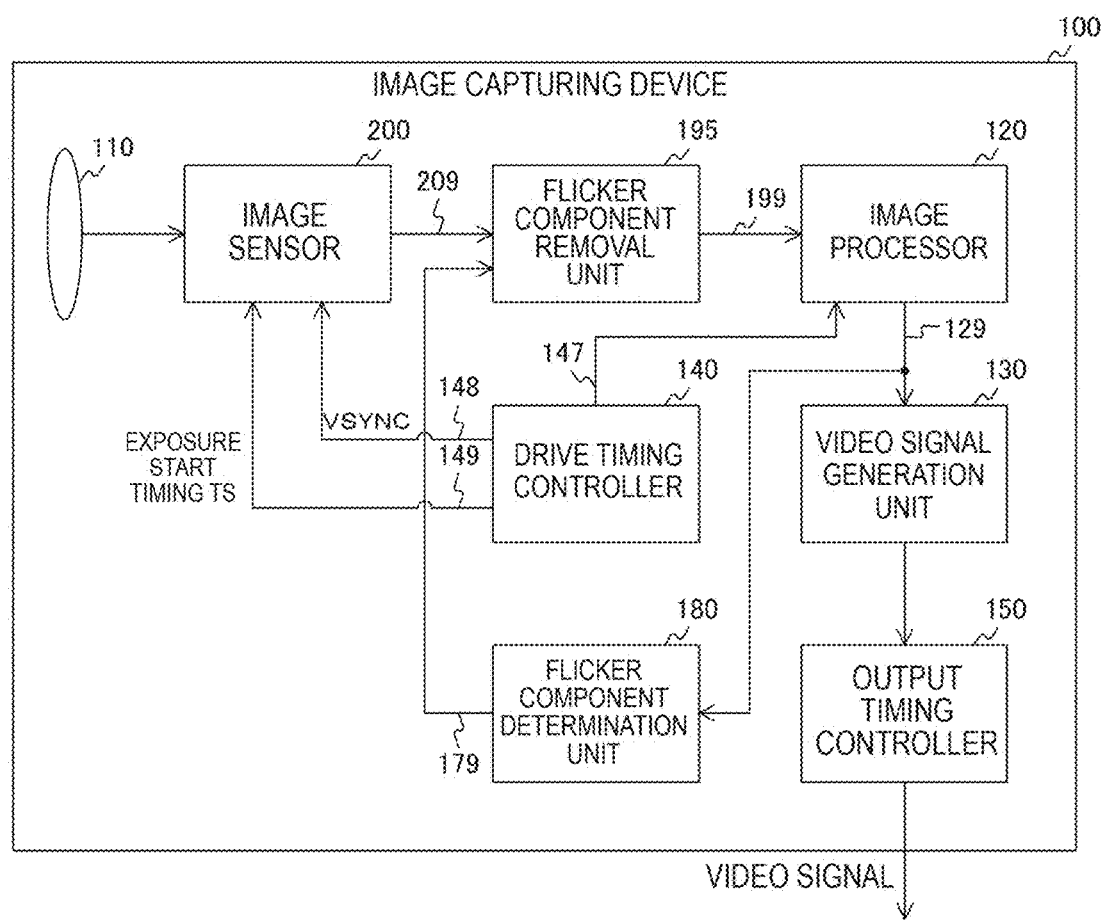
FIG. 14 is a block diagram illustrating an exemplary configuration of an image capturing device according to a second modification of the second embodiment.

FIG. 14 is a block diagram illustrating an exemplary configuration of the image capturing device 100 according to the second modification of the second embodiment. The second modification is different from the second embodiment in that the image capturing device 100 according to the second modification is configured to include a flicker component removal unit 195 instead of the flicker component removal unit 160. Moreover, the flicker component removal unit 195 may be provided in the image capturing device 100 according to the first embodiment.

The flicker component removal unit 195 is configured to remove a flicker component by controlling a gain with respect to the image data from the image sensor 200. In a case where a flicker component is not present, the flicker component removal unit 195 supplies a result obtained by multiplying all the pixel data from the image sensor 200 by the same coefficient (e.g., 1) to the image processor 120.

On the other hand, if a flicker component is determined to be present, the flicker component removal unit 195 supplies a result obtained by multiplying each of pixel data in line data of y lines by the coefficient of Is(y)/Ys(y, n) to the image processor 120. The multiplication of the coefficient, that is, the amplification by a gain allows a flicker component to be removed based on Formula (4) and thus only a DC component remains.

Furthermore, the flicker component determination unit 180 according to the second modification supplies Is(y) and Ys(y, n) to the flicker component removal unit 195 together with a determination result.

In this way, according to the second modification of the second embodiment, the image capturing device 100 removes a flicker component by controlling a gain, and thus it is possible to remove a flicker component with no change in exposure time.

The above-described embodiments are examples for embodying the present technology, and matters in the embodiments each have a corresponding relationship with disclosure-specific matters in the claims. Likewise, the matters in the embodiments and the disclosure-specific matters in the claims denoted by the same names have a corresponding relationship with each other. However, the present technology is not limited to the embodiments, and various modifications of the embodiments may be embodied in the scope of the present technology without departing from the spirit of the present technology.

The processing sequences that are described in the embodiments described above may be handled as a method having a series of sequences or may be handled as a program for causing a computer to execute the series of sequences and recording medium storing the program. As the recording medium, a hard disk, a CD (Compact Disc), an MD (Mini-Disc), and a DVD (Digital Versatile Disk), a memory card, and a Blu-ray disc (registered trademark) can be used.

In addition, the effects described in the present specification are not limiting but are merely examples, and there may be additional effects.

Additionally, the present technology may also be configured as below.

(1)

An image capturing device including:

an image sensor configured to perform a process of generating image data by exposing a plurality of lines, each of which including a plurality of pixels, in sequence over a predetermined exposure time from exposure start timings that are different from each other whenever a predetermined period of a vertical synchronization signal elapses;

a timing controller configured to perform control for shifting each of the exposure start timings by a fixed time interval whenever the period elapses;

a determination unit configured to determine whether a component having luminance varying at a predetermined frequency along a direction perpendicular to the plurality of lines in the image data is present; and a removal unit configured to remove the component in the image data in a case where the component is determined to be present.

(2)

The image capturing device according to (1), wherein the predetermined frequency is any one of two frequencies that are different from each other, and the fixed time interval is a value corresponding to a larger one of an amount of variation in the period of a phase of the component of the one of the two frequencies and an amount of variation in the period of a phase of the component of the other of the two frequencies.

(3)

The image capturing device according to (1) or (2), wherein the vertical synchronization signal is a signal conforming to a National Television System Committee (NTSC) standard, and the fixed time interval is one third of the period.

(4)

The image capturing device according to (3), wherein the image data includes a plurality of pieces of line data, and the flicker component determination unit includes an average value calculation unit configured to calculate an average value of the line data in a period of time three times longer than the period, a divider configured to divide the line data by the average value and output a divided value, a frequency analysis unit configured to analyze a frequency of a signal of the divided value and generate an analysis result, and a determination result generation unit configured to determine whether the component is present based on the analysis result and generate a determination result.

(5)

The image capturing device according to (1), wherein the vertical synchronization signal is a signal conforming to a Phase Alternating Line (PAL) standard, and the fixed time interval is one fifth of the period.

(6)

The image capturing device according to (5), wherein the image data includes a plurality of pieces of line data, and the flicker component determination unit includes an average value calculation unit configured to calculate an average value of the line data in a period of time five times longer than the period, a divider configured to divide the line data by the average value and output a divided value, a frequency analysis unit configured to analyze a frequency of a signal of the divided value and generate an analysis result, and a determination result generation unit configured to determine whether the component is present based on the analysis result and generate a determination result.

(7)

The image capturing device according to any one of (1) to (6), wherein control for shifting an output timing to output the image data by a time corresponding to the fixed time interval is performed whenever the period elapses for outputting the image data based on the shifted output timing.

(8)

The image capturing device according to any one of (1) to (7), wherein the removal unit removes the component by setting the exposure time to a fixed value.

(9)

The image capturing device according to any one of (1) to (8), wherein the image data includes a plurality of pieces of pixel data, and the removal unit removes the component by incrementing or decrementing a value of each of the plurality of pieces of pixel data.

(10)

A method of controlling an image capturing device, the method including:

an image capturing process of performing, by an image sensor, a process of generating image data by exposing a plurality of lines, each of which including a plurality of pixels, in sequence over a predetermined exposure time from exposure start timings that are different from each other whenever a predetermined period of a vertical synchronization signal elapses;

a timing controlling process of performing, by a timing controller, control for shifting each of the exposure start timings by a fixed time interval whenever the period elapses;

a determining process of determining, by a determination unit, whether a component having luminance varying at a predetermined frequency along a direction perpendicular to the plurality of lines in the image data is present; and a removing process of removing, by a removal unit, the component in the image data in a case where the component is determined to be present.

REFERENCE SIGNS LIST 100 image capturing device
110 image capturing lens
120 image processor
130 video signal generation unit
140, 141 drive timing controller
150 output timing controller
160, 195 flicker component removal unit
170, 180, 190 flicker component determination unit
171 line average value calculation unit
172, 173, 181, 182 line average value storage unit
174 three-frame average value calculation unit
175 divider
176 frequency analysis unit
177 determination result generation unit
183 five-frame average value calculation unit
191, 192 switch
193 three- or five-frame average value calculation unit
200 image sensor
210 row scanning circuit
220 pixel array section
230 pixel
250 timing control circuit
260 AD converter
270 column scanning circuit

The invention claimed is:

1. An image capturing device comprising:
an image sensor configured to perform a process of generating image data by exposing a plurality of lines, each of which includes a plurality of pixels, in sequence over a predetermined exposure time from exposure start timings that are different from each other whenever a predetermined period of a vertical synchronization signal elapses; and
a computer including a processing device and a memory device containing instructions that, when executed by the processing device, are configured to:
perform control for shifting each of the exposure start timings by a fixed time interval whenever the predetermined period elapses;
determine whether a component having luminance varying at a predetermined frequency along a direction perpendicular to the plurality of lines in the image data is present; and
remove the component in the image data in a case where the component is determined to be present, wherein the predetermined frequency is any one of two frequencies that are different from each other, and the fixed time interval is a value corresponding to a larger one of an amount of variation in the period of a phase of the component of the one of the two frequencies and an amount of variation in the period of a phase of the component of the other of the two frequencies.

2. The image capturing device according to claim 1, wherein
the vertical synchronization signal is a signal conforming to a National Television System Committee (NTSC) standard, and
the fixed time interval is one third of the predetermined period.

3. The image capturing device according to claim 2, wherein
the image data includes a plurality of pieces of line data, and
the instructions are configured to:
calculate an average value of the line data in a period of time three times longer than the period,
divide the line data by the average value and output a divided value,
analyze a frequency of a signal of the divided value and generate an analysis result, and
determine whether the component is present based on the analysis result and generate a determination result.

4. The image capturing device according to claim 1, wherein
the vertical synchronization signal is a signal conforming to a Phase Alternating Line (PAL) standard, and
the fixed time interval is one fifth of the predetermined period.

5. The image capturing device according to claim 4, wherein
the image data includes a plurality of pieces of line data, and
the flicker component determination unit includes
an average value calculation unit configured to calculate an average value of the line data in a period of time five times longer than the perdetermined period,
a divider configured to divide the line data by the average value and output a divided value,
a frequency analysis unit configured to analyze a frequency of a signal of the divided value and generate an analysis result, and
a determination result generation unit configured to determine whether the component is present based on the analysis result and generate a determination result.

6. An image capturing device comprising:
an image sensor configured to perform a process of generating image data by exposing a plurality of lines, each of which includes a plurality of pixels, in sequence over a predetermined exposure time from exposure start timings that are different from each other whenever a predetermined period of a vertical synchronization signal elapses; and a computer including a processing device and a memory device containing instructions that, when executed by the processing device, are configured to:
perform control for shifting each of the exposure start timings by a fixed time interval whenever the predetermined period elapses;
determine whether a component having luminance varying at a predetermined frequency along a direction perpendicular to the plurality of lines in the image data is present; and
remove the component in the image data in a case where the component is determined to be present, wherein
control for shifting an output timing to output the image data by a time corresponding to the fixed time interval is performed whenever the period elapses for outputting the image data based on the shifted output timing.

7. The image capturing device according to claim 1, wherein
the instructions are configured to remove the component by setting the exposure time to a fixed value.

8. The image capturing device according to claim 1, wherein
the image data includes a plurality of pieces of pixel data, and
the removal unit removes the component by incrementing or decrementing a value of each of the plurality of pieces of pixel data.

9. A method of controlling an image capturing device, the method comprising:
an image capturing process of performing, by an image sensor, a process of generating image data by exposing a plurality of lines, each of which includes a plurality of pixels, in sequence over a predetermined exposure time from exposure start timings that are different from each other whenever a predetermined period of a vertical synchronization signal elapses;
a timing controlling process of performing, by a timing controller, control for shifting each of the exposure start timings by a fixed time interval whenever the predetermined period elapses;
a determining process of determining, by a determination unit, whether a component having luminance varying at a predetermined frequency along a direction perpendicular to the plurality of lines in the image data is present; and
a removing process of removing, by a removal unit, the component in the image data in a case where the component is determined to be present, wherein the predetermined frequency is any one of two frequencies that are different from each other, and the fixed time interval is a value corresponding to a larger one of an amount of variation in the period of a phase of the component of the one of the two frequencies and an amount of variation in the period of a phase of the component of the other of the two frequencies.

* * * * *